United States Patent [19]
Fonkalsrud

[11] Patent Number: 5,317,046
[45] Date of Patent: May 31, 1994

[54] POLYAMIDE-EPOXY-SILICONE MODIFIED COATING COMPOSITIONS

[76] Inventor: Philip A. Fonkalsrud, 4229 E. 77th St., Tulsa, Okla. 74136

[21] Appl. No.: 959,620

[22] Filed: Oct. 13, 1992

[51] Int. Cl.$^5$ .............................. C08K 3/20; C08L 63/00
[52] U.S. Cl. ......................................... 523/425; 528/10
[58] Field of Search ........................... 523/425; 528/10

[56] References Cited

U.S. PATENT DOCUMENTS

| | | |
|---|---|---|
| 3,294,709 | 12/1966 | Nitzsche et al. .................... 523/425 |
| 3,449,278 | 6/1969 | McKay et al. . |
| 4,308,183 | 12/1981 | Williams . |
| 4,330,444 | 5/1982 | Pollman . |

OTHER PUBLICATIONS

Lee and Neville, Handbook of Epoxy Resins, 1967, p. 10-8.

*Primary Examiner*—Melvin I. Marquis
*Assistant Examiner*—D. Aylward
*Attorney, Agent, or Firm*—Joseph F. Long

[57] ABSTRACT

Polyamide—Epoxy—Silicone modified compositions in a water base that are air curable to give tough flexible coatings that may be pigment loaded and maintain the chemical resistance and bonding capabilities of the usual epoxy coatings with hardness and gloss equal to or greater than baked epoxy coatings is disclosed.

6 Claims, 2 Drawing Sheets

POLYAMIDE-EPOXY-SILICONE MODIFIED COATING COMPOSITIONS

BACKGROUND OF THE INVENTION

There is a need for a paint type coating that has all the following characteristics:
(a) is water based;
(b) is air curable;
(c) has flexibility and hardness greater than normal baked epoxy coatings;
(d) is chemical and sunlight resistant;
(e) is non-inflammable;
(f) has reasonable pot life;
(g) forms a low friction surface;
(h) has a tough durable high gloss surface;
(i) has a low volatile content.

The preferred compositions of this invention have all the desired characteristics except good sunlight resistance. Sunlight resistance may be attained by coating the cured composition of the invention with a water base zinc rich coating which is further coated with a water base aliphatic urethane finish coat for maximum durability.

We have found that a preferred polyamide epoxy composition with ratio by weight of polyamide to epoxy varying between about 0.6 to 1.8 when combined with a reactive siloxane hereinafter called silicone at a ratio of 0.04 to 0.18 silicone to epoxy with about 10 to 30 percent of a pigment such as titanium dioxide will give essentially all the desirable properties as outlined except sunlight resistance. Testing of one preferred formulation by a large poultry processor gave a 10 fold reduction in bacteria growth as compared with normal epoxy polyamide coating.

These preferred coating compositions can be used where any solvent base epoxy coating is used with advantages in clean-up, environmental safety, solvent exposure, and minimal odor.

SUMMARY OF THE INVENTION

The invention comprises compositions with fifteen to thirty-five percent polyamides; epoxy with a polyamide to epoxy ratio of about 0.6 to 1.8; a reactive siloxane present in a ratio of siloxane to epoxy from about 0.04 to about 0.18; a pigment such as titanium dioxide and suitable solvents and dispersants.

One experimentally determined formulation with near optimum properties has a composition comprising ten components as follows:
20.30% Polyamide
20.30% Water
6.96% Butyl cellosolve
0.40% Defoaming agent
0.66% Dispersant
19.90% Titanium Dioxide
5.44% Isopropyl Alcohol
0.26% TeXanolT TM
24.21% Epoxy Resin
1.37% Reactive Silicone
100.00%

Percentages are given in weight percent for the composition after mixing. One part, sometimes called the activator composition, would comprise epoxy mixed with the silicone and the other part called the base comprises the remainder of the chemicals as listed. When the base and activator compositions as outlined are mixed a reaction occurs. The reacting mixture has about a four hour pot life and when applied air drys at about 77° F. in approximately 24 to 36 hours to give a glossy white coating with a hardness of about 138 as measured with the usual pendulum test meter; this 138 hardness being about 30% harder than the normal baked on epoxy formulation; which have a hardness of about 95 to 100. This composition may also be essentially cured in about thirty minutes at 145° F.

Sunlight resistance may be attained by coating the cured composition of the invention with a water base aliphatic urethane coat for maximum durability.

For a maximum corrosion resistant coating system for use in saltwater and high humidity conditions, the pigment portion of the invention can be changed to a corrosion inhibiting pigment such as zinc, dust, zinc chromate, etc., for a prime coat to stop underfilm corrosion. This corrosion inhibiting zinc rich prime coat can then be coated with the standard pigmented composition of the invention and then covered with the water base aliphatic urethane finish coat for a maximum resistant coating system.

A detailed consideration of several experimental formulations indicated that minor changes could be made to improve properties. We, therefore, wish to be limited only to the general purpose and spirit of the invention as outlined in these specifications and claims.

DESCRIPTION OF TABLE 1

The table shows compositions and properties for ten differing compositions as experimentally determined.

TABLE 1

Figure 1:
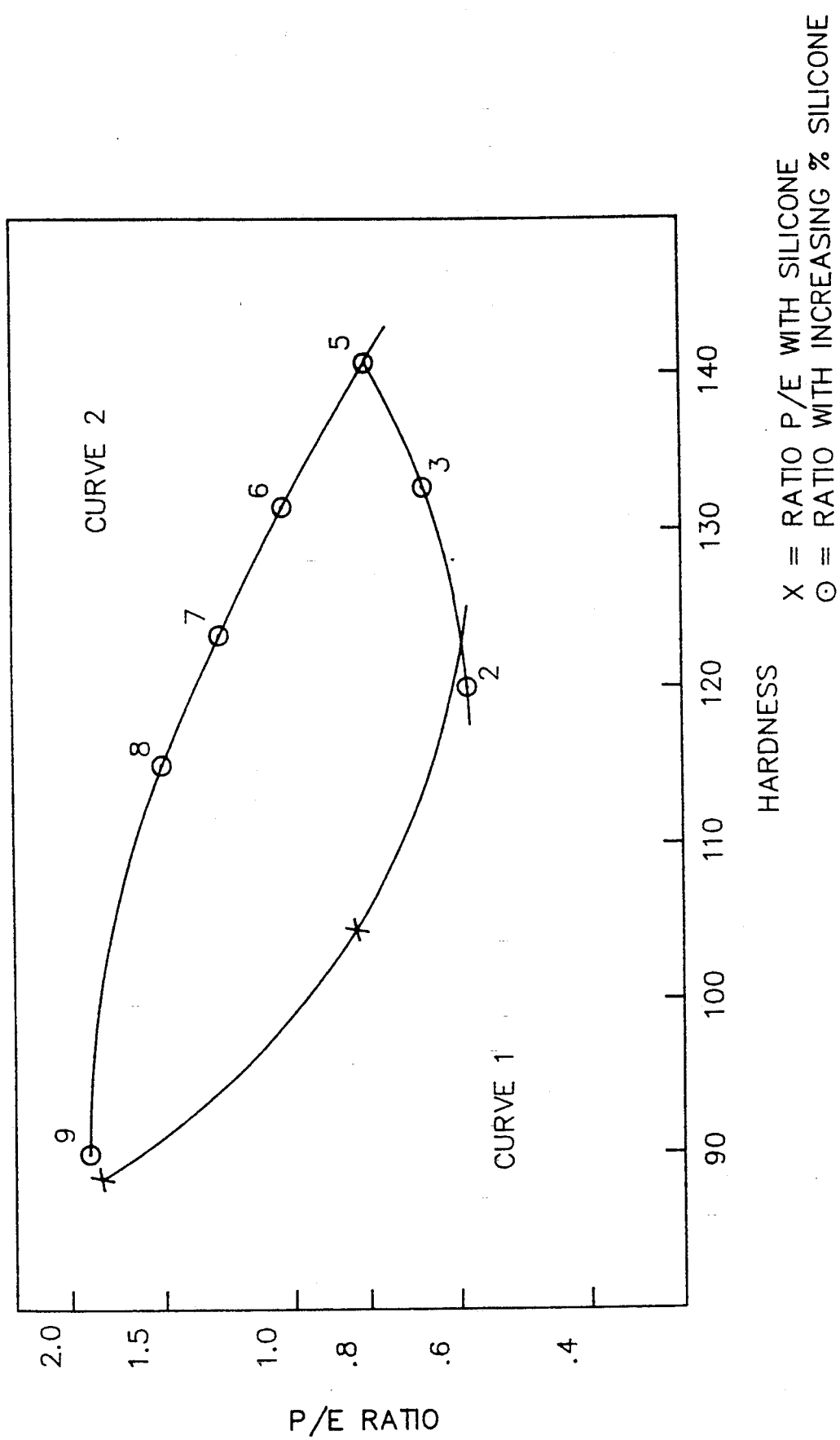
FIG. 1 shows P/E ratio data with and without silicone as taken from Table I plotted on a semi-log scale for the P/E ratio versus hardness as an arithmetic scale.

| | TEN DIFFERING COMPOSITIONS - COMPONENTS IN % OF TOTAL | | | | | | | | | |
|---|---|---|---|---|---|---|---|---|---|---|
| | 1 | 2 | 3 | 4 | 5 | 6 | 7 | 8 | 9 | 10 |
| Polyamide | 16.25 | 16.05 | 18.25 | 20.62 | 20.30 | 22.64 | 24.73 | 26.34 | 28.79 | 29.63 |
| Water | 16.25 | 16.05 | 18.25 | 20.62 | 20.30 | 22.64 | 24.73 | 26.54 | 28.79 | 29.63 |
| Butyl Cellosolve | 8.14 | 8.04 | 7.48 | 7.07 | 6.96 | 6.42 | 5.84 | 5.40 | 4.77 | 4.91 |
| Defoamer | 0.37 | 0.37 | 0.43 | 0.41 | 0.40 | 0.37 | 0.33 | 0.31 | 0.27 | 0.28 |
| Dispersant | 0.84 | 0.83 | 0.71 | 0.67 | 0.66 | 0.61 | 0.56 | 0.51 | 0.45 | 0.46 |
| Titanium Dioxide | 23.30 | 23.02 | 21.38 | 20.22 | 19.90 | 18.35 | 16.67 | 15.43 | 14.62 | 14.02 |
| Isopropyl Alcohol | 6.26 | 6.19 | 5.84 | 5.53 | 5.44 | 5.02 | 4.56 | 4.21 | 3.72 | 3.83 |
| Texanol TM | 0.32 | 0.31 | 0.28 | 0.26 | 0.26 | 0.24 | 0.22 | 0.20 | 0.18 | 0.18 |
| Epoxy Resin | 28.27 | 27.93 | 26.03 | | 24.21 | 22.34 | 20.29 | 18.77 | 16.58 | 17.06 |
| Reactive Silicone | 0 | 1.21 | 1.35 | 0 | 1.57 | 1.37 | 2.07 | 2.08 | 2.83 | 0 |
| Hardness | 121 | 118 | 132 | 105 | 138 | 131 | 122 | 114 | 91 | 87 |
| Ratio Polyamide/Epoxy | 0.58 | 0.59 | 0.72 | 0.84 | 0.86 | 1.04 | 1.25 | 1.45 | 1.78 | 1.74 |

TABLE 1-continued

| TEN DIFFERING COMPOSITIONS - COMPONENTS IN % OF TOTAL | | | | | | | | | |
|---|---|---|---|---|---|---|---|---|---|
| 1 | 2 | 3 | 4 | 5 | 6 | 7 | 8 | 9 | 10 |
| Gloss | | | | | | | | | |
| — | 84.2 to 84.7 | 90.0 to 90.3 | — | 96.0 to 96.2 | 88.3 to 91.1 | 82.9 to 91.3 | 81.3 to 8.97 | 82.3 to 89.6 | — |
| Ratio Silicone × 100/Epoxy | | | | | | | | | |
| 0 | 4.3 | 5.2 | 0 | 6.5 | 5.9 | 10.2 | 11.1 | 17.1 | 0 |

DETAILED DESCRIPTION OF THE INVENTION

The invention may best be described from consideration of the experimental data as shown in Table 1 and mathematical treatment of this data as shown in FIG. I and FIG. II. The major components of the 10 compositions as shown in Table I are more completely defined the polyamide is self emulsifying modified polyamide sold by Pacific Anchor Chemical Corp as Casamid 60, 362 and 362W; these are sold as 50% solution of modified polyamides in water with equivalent weights per reactive hydrogen of 280, 240, and 240 respectively.

the dispersant is a nonylphenexy poly ethanol sold as Igipal Co.—897 by Air Products Co.

the titanium dioxide is available from Dupont Co., as DuPont Product R-900

Texanol TM is an Ester-Alcohol commonly used as a diluent in epoxy paints and is sold as Texanol TM by Texas Eastman Co., also called TMPD mono-isobutyrate which is trimethyl-1,3 pentanediol—mono-isobutyrate the defoamer is a mixture of hydrophobic components in mineral oil and is sold by BYK-Chemic USA as BYK ® 034, and is recommended for foam prevention when used in an amount of 0.1–0.5% of a total formulation The epoxy resin is a Bis-phenol A/Epichlorohydrin epoxy sold by Shell Chemical as Product Epon 828 and is mixed with 15.0 percent of EPODIL ® 742 Reactive Diluent sold by Pacific Anchor Chemical Corp.; Epon 828 having a viscosity of 110–150 and an epoxide equivalent weight of 185.192 and Epodil 742 reactive diluent being cresyl glycidyl ether The silicone used in a reactive polyether modified hydroxy-functional poly-dimethylsiloxane sold as Byk370 TM by BYK-Chime USA as a solution of 22–28% solids in a solvent with the OH-value of solids at about 35.

Although these particular compounds were used in the experimental work, we would expect that other epoxy resins with an hydroxy number of 175 to 205 and other polyamide curing agents with equivalent weight of 110 to 285 and other reactive organic silicon containing compounds would also be usable for equivalent properties. Now inspection of Table I indicates a maximum hardness and maximum gloss in Column 5 where the polyamide to P/E, is 0.86 and the silicone to epoxy ratio times 100 equals 6.5. Further in Column 3 we see a hardness of 132 with polyamide to epoxy ratio of 0.72 and silicon to epoxy ratio times 100 of 5.2. Also in Column 6 we see a hardness of 131 with polyamide to epoxy ratio of 1.04 and a silicon to epoxy ratio times 100 equal to 5.9.

It is known in the art that increasing the polyamide to epoxy ratio decreases hardness. Looking now at FIG. 1 we have plotted the ratio of polyamide to epoxy as shown in Column 1, 4, and 10 from Table I on a semilog scale versus hardness and we see that hardness does decrease with increase in the polyamide to epoxy ratio in a slightly curved line when no silicone is present.

In the Curve 2 we've plotted the data from Columns 2, 3, 5, 6, 7, 8 and 9 as shown in with a dot in a circle. This curve shows that with a ratio of polyamide to epoxy of 1.78 and a ratio of silicone to epoxy x100 of 17.1 (Col. 9) that hardness is 91. In Table 1, Col. 10, shows that with no silicone and ratio of polyamide to epoxy of 1.74 the hardness is essentially the same at 87. Now quite unexpectedly with the addition of silicone in the siloxane form we see that at point 8 on Curve 2, the hardness is about 114 and at the same polyamide—epoxy ratio on curve 1 the hardness is about 92. Thus, at this ratio the hardness increased 22 points by active silicone addition. At point 7 with about the same silicone the difference in hardness is about 26 points; at point 6 with silicone much lower than at point 7, the difference is about 30 points, at point 5 the difference is about 33 points. Now, at point 3, the difference is about 22 points and at point 2 there is essentially 0 points difference.

From these two curves, we can conclude that starting at a polyamide to epoxy ratio of about 1.78 and decreasing to a ratio of about 0.86 that hardness as measured by a pendulum hardness tester increases from about 22 to 32 points by addition of a reactive silicone in an amount greater than 1.56 percent when compared to the same ratio of polyamide to epoxy without silicone addition.

Figure 2:
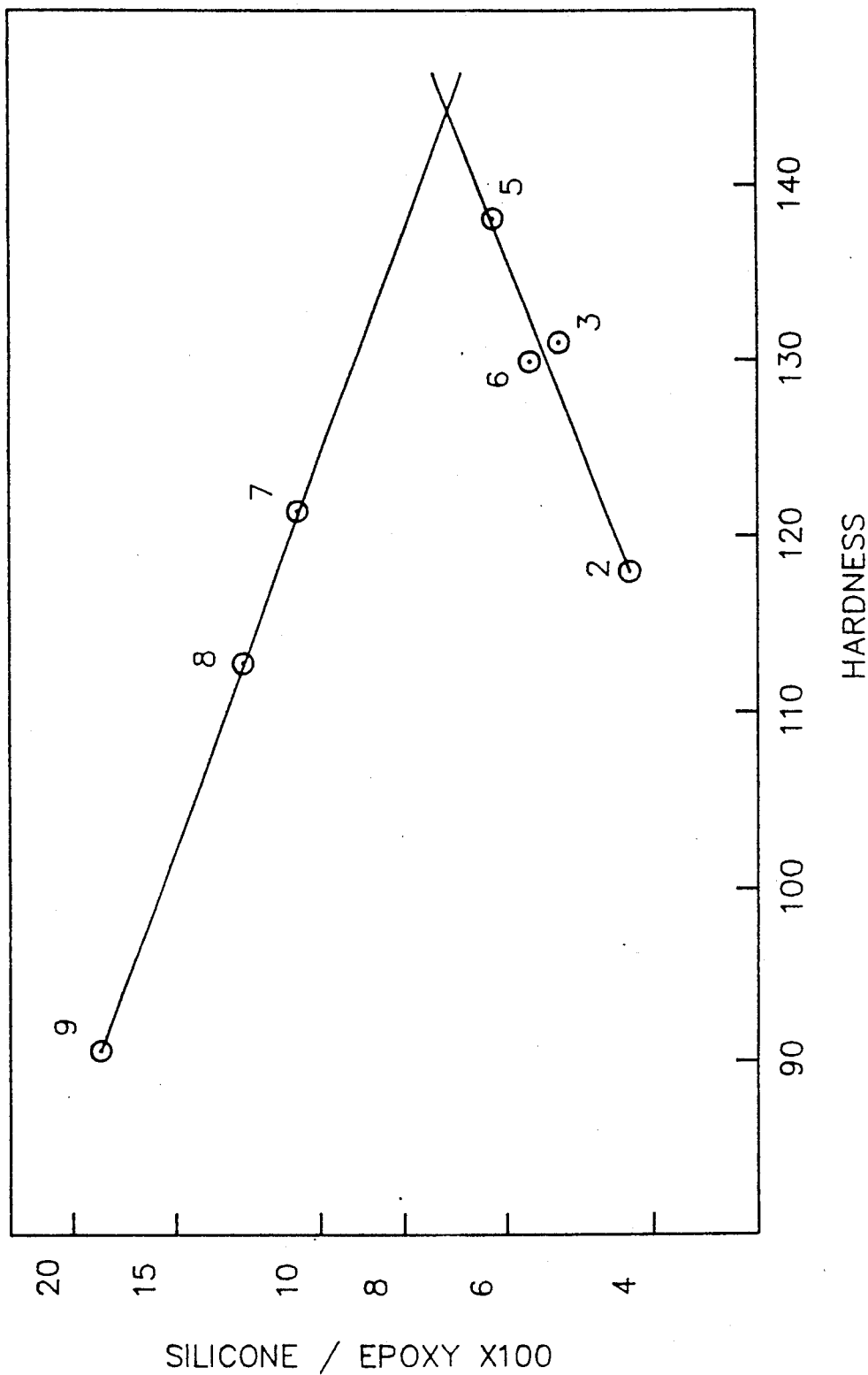
FIG. 2 shows the ratio of silicone to epoxy times 100 plotted on a semi-log versus hardness.

To further examine the data in Table I we plotted the ratio of silicone to epoxy multiplied by 100, or silicone as a percentage of the epoxy, in a semi-log scale versus hardness as shown in FIG. 2. We see increasing hardness as the ratio of silicone to epoxy or the percent silicon to epoxy increases from 4.3 to 6.5 With increase from 10.2 to 17.1 the hardness decreases with intersection of the lines indicating a probable maximum at about a hardness of 143 and a ratio or percentage of silicone to epoxy of about 7.1 to 7.2. Points 3 and 6 are quite interesting in that the ratio of polyamide to epoxy for point 3 was 0.72 and the ratio of polyamide to epoxy for point 6 was 1.04; thus, indicating that the ratio of silicone in epoxy has greater influence in these compositions than the ratio of polyamide to epoxy. However, we would expect the higher ratio of polyamide to epoxy to be more flexible. With further increases in the silicone to epoxy ratio and increases in the polyamide to epoxy ratio hardness decreases; however, as previously indicated on FIG. 1, the hardness continues 20 to 30 points harder than the hardness at comparable polyamide to epoxy ratios without silicone addition until the silicone to epoxy ratio is quite high. We would expect that the maximum effect on hardness may be at a silicone to epoxy ratio times 100 of about 7.2. Additional silicone does affect other properties. With changes in hardness as discussed change in other properties of the cured film would be expected. As indicated in Table I, gloss as measured with a standard reflectometer does increase to a maximum of 96 in the same composition giving the maximum hardness. A gloss measurement of 96 would be a very high gloss to an observer. Gloss measurement is influenced greatly by sample preparation and at this gloss level precise results would not be expected.

It is known that higher ratios of polyamide to epoxy give more flexible coatings. We have, with addition of silicone, produced both harder and more flexible coatings.

Experimentally it has been found that formulations as given in Table I may be forced air cured at 140° F. for 30 minutes to attain approximately 90 percent of the final hardness or may be air cured to essentially same hardness at 77° F. for 24 hours.

Preferred formulations have a polyamide to epoxy ratio of about 0.6 to 1.8 with silicone addition from about four to seventeen percent of the epoxy used. These formulations when air cured for 24 hours at 77° F. or force air cured for 30 minutes at 140° F. all are up to 30% harder than normal baked an enamel.

A composition as listed in Column 5 in Table I wherein the polyamide to epoxy ratio is about 0.8 and the silicone added is about 6.5 to 7.5 percent of the epoxy content is preferred for hardest, highest gloss and most dense coating. This composition is used for a Graffiti resistant, bacteria resistant coating. A harder less flexible composition as listed in Column 2 of Table I with a ratio of polyamide to epoxy of about 0.6 and the silicone added at about 4.3 percent of the epoxy is preferred for minimal film flexing situations such as coating steel.

For a flexible coating with outstanding water resistance a composition as listed in Column 9 in Table I wherein the polyamide to epoxy ratio is about 1.8 and the added silicone is about 17 percent of the epoxy is the preferred composition.

All data shown indicates use of titanium dioxide pigments but other colored pigments have been shown to be equally satisfactory.

All compositions are stored in two parts with the epoxy and its diluent and the reactive silicone and butyl cellosolve in one part and polyamide and other components as listed in another part. Pot life after mixing is about four hours.

What is claimed is:

1. A water base epoxy coating composition consisting essentially of:
   (a) fifteen to thirty weight percent polyamide;
   (b) an epoxy resin mixed with said polyamide in a weight ratio of polyamide to epoxy of about 0.6 to 1.8;
   (c) a reactive siloxane mixed with said epoxy in a weight ratio of about 0.04 to 0.17 of said reactive siloxane to said epoxy;
   (d) 14 to 24% by weight of a pigment to add color and opacity to said composition;
   (e) 0.4 to 0.8 percent by weight of dispersant and solvent comprising 4 to 8 percent butyl cellosolve by weight 3½ to 6½ percent alcohol, and 0.2 to 0.4 percent by weight of TMPD Isobuty rate to facilitate mixing of said polyamide, said epoxy resin, said reactive siloxane and said pigment.

2. A water base epoxy coating composition as in claim 1 where in said pigment is titanium dioxide; said dispersant is a nonylphenoxy poly ethanol and wherein said reactive siloxane is a reactive polyether modified hydroxy-functional polydimethylsiloxane that reacts with OH groups and becomes incorporated in the polymer compound.

3. A Water base epoxy coating composition consisting essentially of:
   (a) a weight percent mixture of:
      18 to 23 percent polyamide
      18 to 23 percent water
      6 to 8 percent butyl cellosolve
      approximately 0.4 percent defoamer
      0.6 to 0.7 percent dispersant
      18 to 23 percent pigment
      5 to 6 percent alcohol
      (0.2 to 0.4 percent TMPD isobutyrate
      22 to 26 percent epoxy resin
      1.3 to 1.8 percent reactive silicone
   to form an air curable coating that cures at about 77° F. in about 30 hours with a hardness 125 as determined by ASTM Method D4366.

4. A water base epoxy coating composition consisting essentially of:
   (a) A weight percent mixture of:
      15 to 30 percent polyamide
      15 to 30 percent water
      4 to 8 percent butyl cellosolve
      2/10 to 4/10 percent defoamer
      4/10 to 8/10 percent dispersant
      14 to 24 percent pigment
      3½ to 6½ percent isopropyl alcohol
      approximately 2/10 to 3/10 percent TMPD isobutyrate
      16 to 29 percent epoxy resin
      1 to 3 percent of a reactive silicone.

5. A water base epoxy coating composition comprising a polyamide, an epoxy, a reactive silicone, and a pigment mixture with suitable dispersant and solvents to form air curable coating that cures in about 30 hours at about 77° F. to a Method D4366 and with a gloss varying between about 80 to 95 as determined by ASTM Method D523.

6. A water base epoxy coating composition as in claim 5 wherein said epoxy has an epoxide equivalent of 180 to 192 and said polyamide has a curing equivalent weight of 110 to 285 and said reactive silicone is hydroxy functional polydimethylsiloxane.

* * * * *